(12) United States Patent
Agrawal et al.

(10) Patent No.: US 10,820,535 B2
(45) Date of Patent: Nov. 3, 2020

(54) FELLING HEAD FOR A FORESTRY MACHINE

(71) Applicant: Deere & Company, Moline, IL (US)

(72) Inventors: Bhupesh Agrawal, Pune (IN); Sean P. West, Dubuque, IA (US); William E. Reeves, Holiday Island, AR (US); Bryon P. Neumann, Paris (CA); Robert Salamon, Dubuque, IA (US); Mark E. Breutzman, Dubuque, IA (US)

(73) Assignee: Deere & Company, Moline, IL (US)

( * ) Notice: Subject to any disclaimer, the term of this patent is extended or adjusted under 35 U.S.C. 154(b) by 561 days.

(21) Appl. No.: 15/685,239

(22) Filed: Aug. 24, 2017

(65) Prior Publication Data

US 2019/0059248 A1 Feb. 28, 2019

(51) Int. Cl.
| | | |
|---|---|---|
| A01G 23/081 | (2006.01) | |
| A01G 23/091 | (2006.01) | |
| B27B 5/10 | (2006.01) | |
| B23D 61/02 | (2006.01) | |

(52) U.S. Cl.
CPC ......... *A01G 23/081* (2013.01); *A01G 23/091* (2013.01); *B23D 61/025* (2013.01); *B27B 5/10* (2013.01); *Y10T 83/8765* (2015.04)

(58) Field of Classification Search
CPC .... A01G 23/08; A01G 23/081; A01G 23/083; A01G 23/091; A01G 23/093; A01G 23/095; B27B 5/10; B27B 17/0091; B27B 17/08; B27B 17/10; Y10T 83/8765–8768; B23D 61/02–10

USPC ......... 83/575–577, 835–855; 310/50, 316.01
See application file for complete search history.

(56) References Cited

U.S. PATENT DOCUMENTS

| | | | |
|---|---|---|---|
| 8,393,443 B2 | 3/2013 | Evans | |
| 2010/0071520 A1* | 3/2010 | Pellymonter | A01G 23/081 83/76 |
| 2017/0077773 A1* | 3/2017 | Li | H02K 21/222 |

OTHER PUBLICATIONS

Murphy, Jim. "What's the Difference Between AC Induction, Permanent Magnet, and Servomotor Technologies?" Apr. 1, 2012. MachineDesign. URL: https://www.nnachinedesign.com/motors-drives/article/21831709/whats-the-difference-between-ac-induction-permanent-magnet-and-servomotor-technologies (Year: 2012).*

(Continued)

*Primary Examiner* — Shelley M Self
*Assistant Examiner* — Katie L. Parr

(57) ABSTRACT

A forestry machine configured to cut timber, where the forestry machine comprises a felling head including a support frame having an accumulation pocket, an accumulating arm, and a harvest arm. The forestry machine further comprises a stator having coils thereon adapted to produce a time varying stator magnetic field, a rotor having at least either a set of slots or a set of permanent magnets mounted thereon facing the stator and adapted to produce a radially directed flux or an axially directed flux. The rotor is rotatably coupled to the stator in axial alignment therewith by the time varying stator magnetic field. The rotor comprises a saw blade.

19 Claims, 5 Drawing Sheets

(56) References Cited

OTHER PUBLICATIONS

McLyman, Wm. T. "Chapter 1: Fundamentals of Magnetics". Transformer and Inductor Design Handbook. Apr. 26, 2011. CRC Press LLC. 4th Edition. pp. 24-51. (Year: 2011).*

Thompson, Jason. "Differences Between Hydraulic Motors & Electric Motors." Apr. 25, 2017. Sciencing. URL: https://web.archive.org/web/20170803172229/https://sciencing.com/differences-hydraulic-motors-electric-motors-7351549.html (Year: 2017).*

* cited by examiner

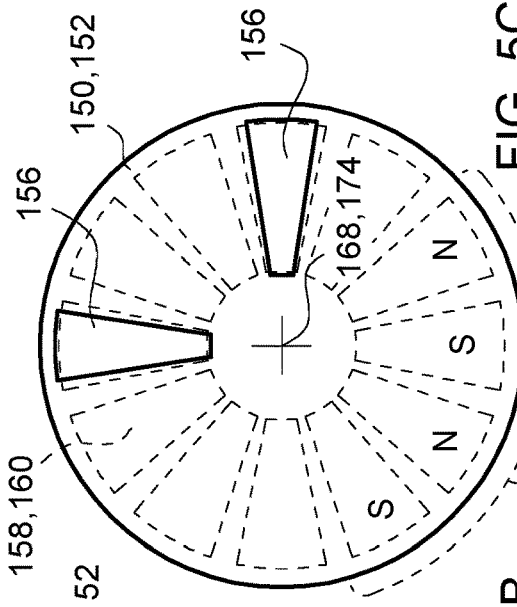
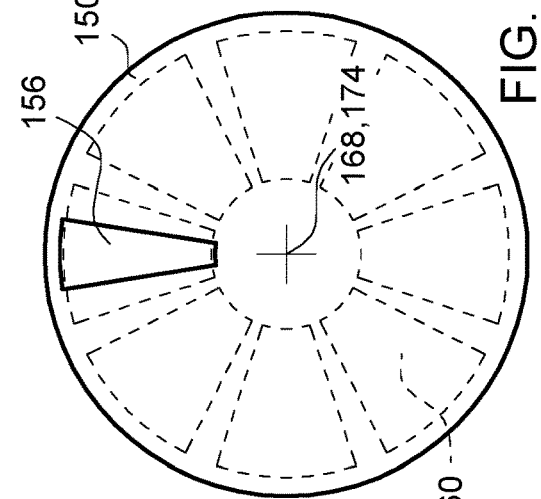
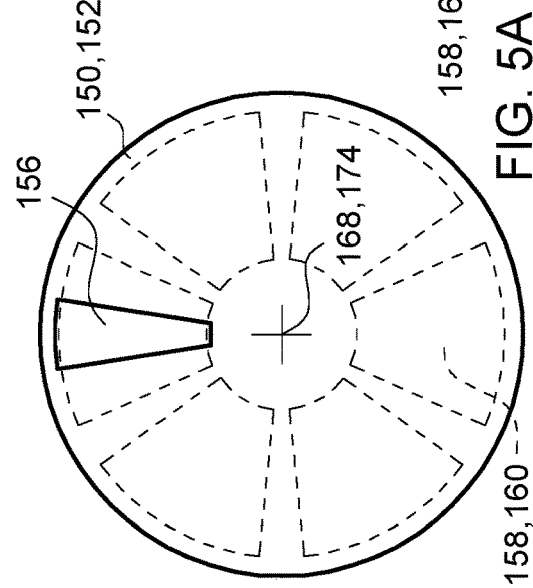
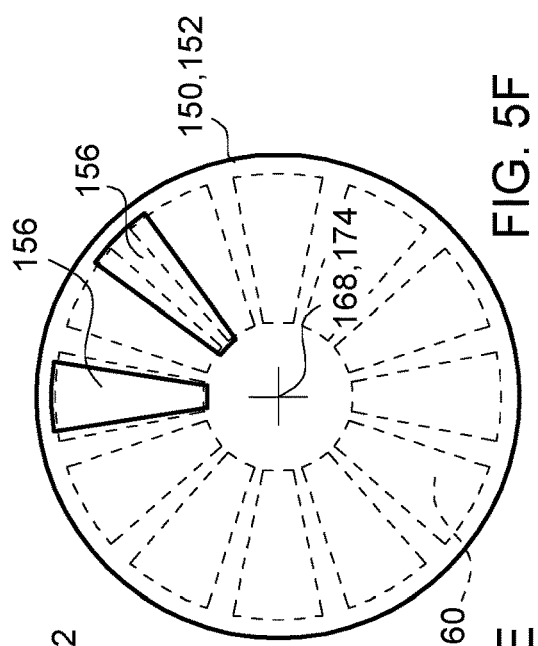
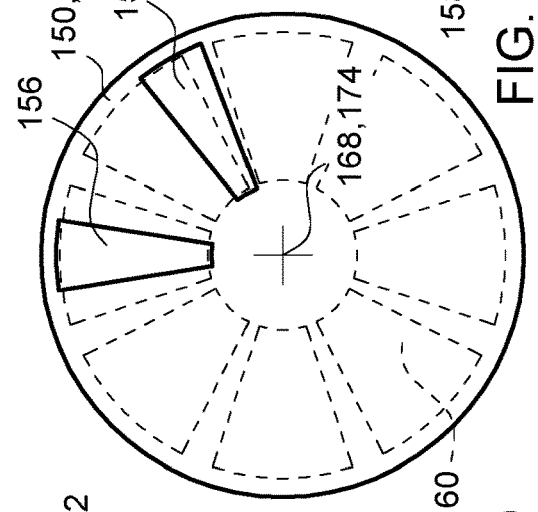
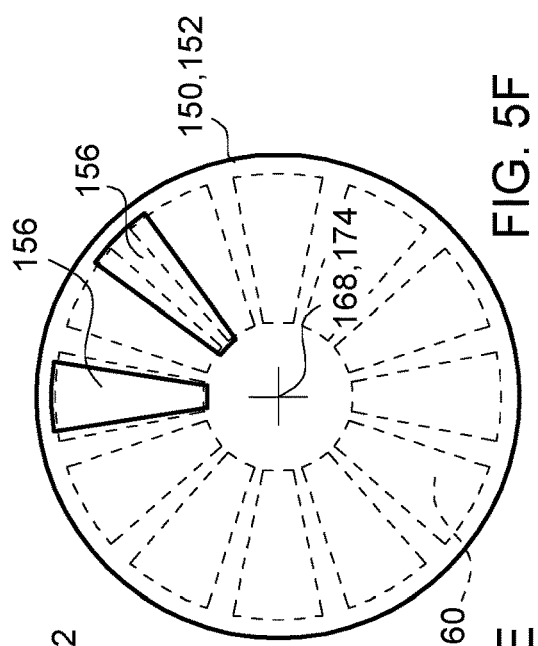

FELLING HEAD FOR A FORESTRY MACHINE

CROSS-REFERENCE TO RELATED APPLICATIONS

N/A

FIELD OF THE DISCLOSURE

The present disclosure relates to a work vehicle, and more particularly to a disc saw felling head for a forestry machine or feller buncher.

BACKGROUND

Operators use forestry machines and feller bunchers to harvest trees and other wood vegetation. A typical tree feller buncher first cuts the tree and then places the tree in bunches on the ground for further processing with other machines, such as skidders or forwarders. Some tree feller bunchers include a felling head with a cutting device for cutting the trees and an accumulation pocket for receiving and holding one or more felled trees until the felled trees are placed in bunches on the ground.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes an apparatus for a feller head for a forestry machine.

According to an aspect of the present disclosure, the felling head of a forestry machine comprises a stator having coils thereon adapted to produce a time varying stator magnetic field, a rotor having either a set of slots or a set of permanent magnets mounted thereon facing the stator that is adapted to produce either a radially directed flux or an axially directed flux. The rotor is rotatably coupled to the stator in axial alignment therewith by the time varying stator magnetic field. The rotor comprises a saw blade.

The felling head further comprises a support frame, wherein the support frame comprises an accumulation pocket, an accumulating arm, and a harvest arm.

The coils of the felling head are disposed circumferentially on at least a portion of the stator at intervals about an axis of the stator. The portion of the stator may not overlap with an accumulation pocket of the support frame.

The coils may further be disposed on less than half the stator.

The coils may further comprise a protective coating.

The stator coils may be multiphase coils for producing a time varying magnetic field of the stator.

The set of slots or the set of permanent magnets may be disposed circumferentially about an axis of the rotor.

The set of slots may comprise a non-ferrous filling.

The permanent magnets may have oppositely directed directions of magnetization.

The rotor and the stator are spaced apart to define a gap therebetween.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 5A is a schematic view of a stator and rotor configuration according to one embodiment for partial axially directed flux.

FIG. 5B is a schematic view of a stator and rotor configuration according to another embodiment for partial axially directed flux.

FIG. 5C is a schematic view of a stator and rotor configuration according to yet another embodiment for partial axially directed flux.

FIG. 5D is a schematic view of a stator and rotor configuration according to another embodiment for partial axially directed flux.

FIG. 5E is a schematic view of a stator and rotor configuration according to yet another embodiment for partial axially directed flux.

FIG. 5F is a schematic view of a stator and rotor configuration according to another embodiment for partial axially directed flux.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
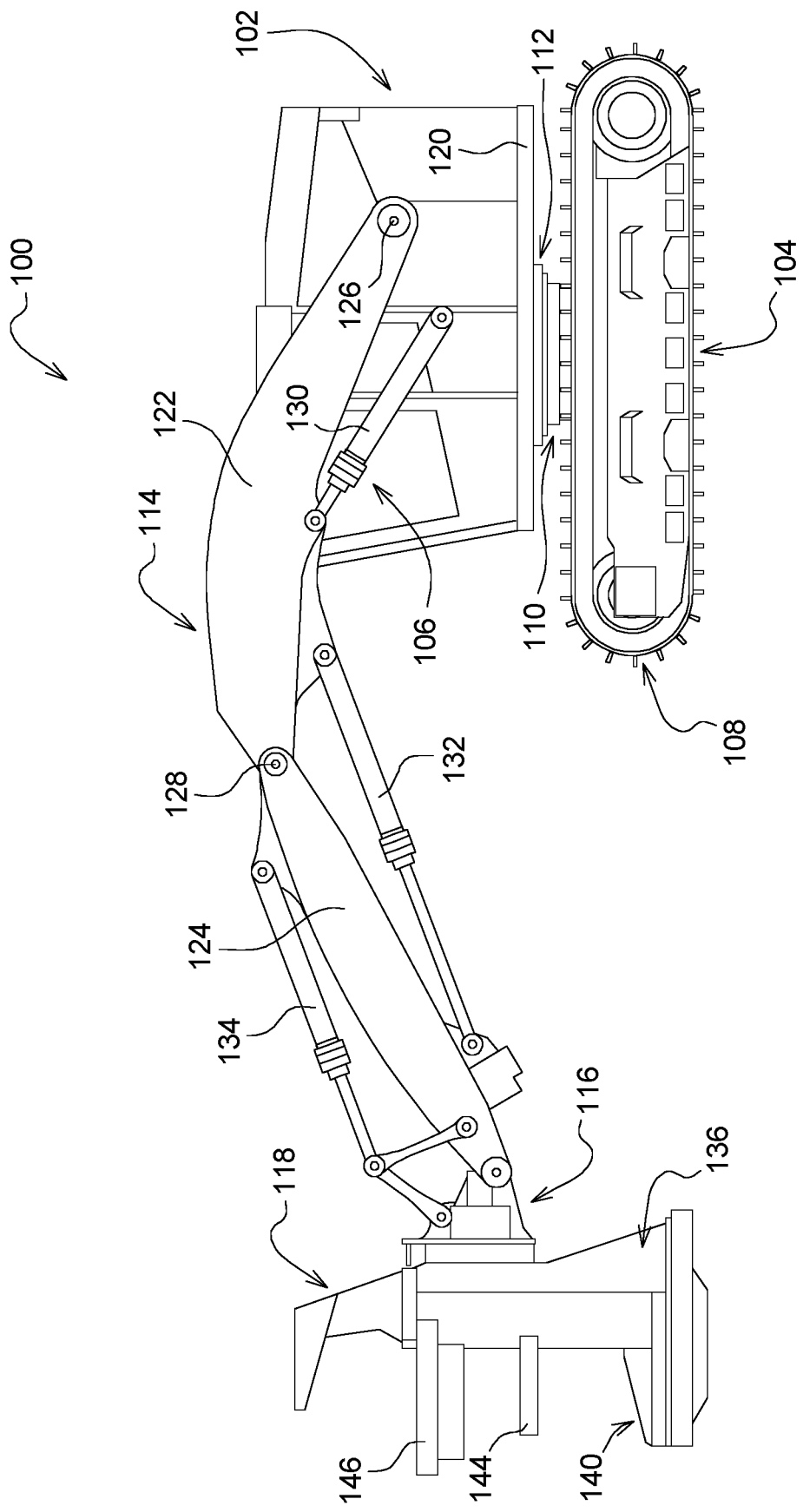
FIG. 1 is a side elevational view of a work machine including a felling head.

In FIG. 1 an example of a work machine, such as a track feller buncher 100, is shown. The present disclosure is not limited, however, to track feller bunchers. Other work machines used in the construction, forestry, and agricultural industries having wheels or skids are also included. As such, while the figures and forthcoming description may relate to a track feller buncher, it is to be understood that the scope of the present disclosure extends beyond a track feller buncher, and where applicable, the term "machine" or "work vehicle" or "forestry machine" will be used instead. The term "machine" or "work vehicle" or "forestry machine" is intended to be broader and encompass other vehicles besides a feller buncher for purposes of this disclosure.

The machine 100 includes an upper frame assembly 102 which is supported by an undercarriage assembly 104. The upper frame assembly 102 can include a cab 106 in which an operator utilizes a plurality of controls (e.g. joysticks, pedals, buttons, screens, etc.) for controlling the machine. The upper frame assembly 102 also includes an engine compartment that houses an engine, such as a diesel engine which provides the power for operating the components associated with the machine 100. Both the cab 106 and the engine compartment can be supported by various frame members that form the upper frame assembly 102.

The undercarriage assembly 104, in one embodiment, includes tracks 108 (e.g. one on a left side of the machine and another on a right side thereof) that engage and move along the ground during operation. The tracks 108 are driven by a drive sprocket (not shown) and a front idler wheel (not shown) about which a track chain (not shown) is entrained. A hydraulic motor operably drives the drive sprocket (which may form part of a high reduction gearset) so as to drive the track chain (not shown) thereby providing power for moving the machine 100.

The upper frame assembly 102 can be mechanically coupled to the undercarriage assembly 104 by a tilt mechanism and turntable assembly 110. The tilt mechanism and turntable assembly 110 operably controls the machine 100 to be rotated and tilted about one or more axes. A swing assembly 112, for example, includes one or more swing motors for driving rotation of the upper frame assembly 102 relative to the undercarriage assembly 104. Operation of the swing assembly 112 rotates a platform 120 of the upper frame assembly 102 relative to the undercarriage 104.

The work machine 100 includes a boom assembly 114. The boom assembly 114 includes a first boom section 122 pivotably coupled to a second boom section 124. As shown in FIG. 1, one end of the first boom section 122 is pivotably coupled to the upper frame assembly 102 via first pivot pin 126. An opposite end of the first boom section 122 is pivotably coupled at a second pivot pin 128 to a first end of the second boom section 124. The second boom section 124 includes a second end coupled to a wrist assembly 116. The wrist assembly includes 116 includes one or more hydraulic motors for powering a work element. As shown in FIG. 1, the work element coupled to the wrist assembly 116 is a felling head 118 for cutting and bunching trees or other woody vegetation.

The work machine 100 may also include a plurality of actuators for controlling the boom assembly 114 and felling head 118. In the example in FIG. 1, the machine 100 includes a first hydraulic actuator 130, a second hydraulic actuator 132, and a third hydraulic actuator 134.

Felling head 118 also includes a support frame 136 supported by the wrist assembly 116. Felling head 118 includes an accumulation pocket 140 into which felled trees are directed for short-term storage while additional trees are felled. According to the exemplary embodiment of the present disclosure, felling head 118 includes a support frame 136 and a circular saw blade 154 (shown in FIGS. 3 and 4) that rotates about an axis of rotation 148. The majority of the blade 154 is covered by support frame 136, but a portion of the blade 154 is exposed to cut the trees or vegetation.

Frame 136 also pivotably supports a harvest arm 146 and an accumulation arm 144 that gather and hold felled trees in accumulation pocket 140. As shown in FIG. 1, harvest arm 146 is designed to guide cut trees into the accumulation pocket 140, while accumulation arm 144 is designed to hold the accumulated trees in the pocket 140. Additional details of an alternative harvest arm are provided in U.S. Pat. No. 5,697,412, the entire disclosure of which is expressly incorporated by reference herein.

Figure 2:
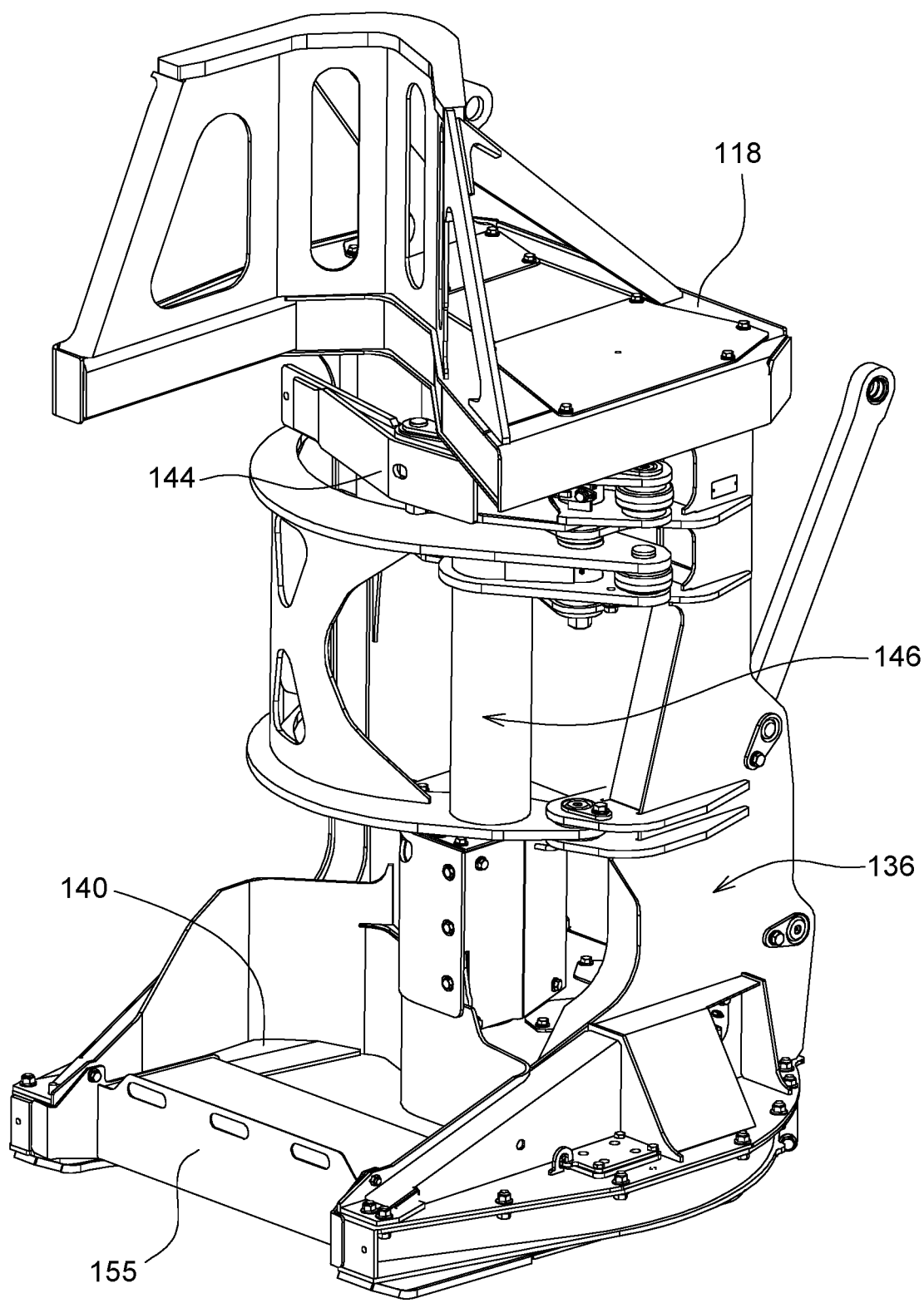
FIG. 2 is a front perspective view of a feller head, according to one embodiment.

FIG. 2 is a front perspective view of a felling head 118, according to one embodiment. As discussed above, the felling head 118 comprises a support frame 136, a harvest arm 146, accumulation arm 144, and an accumulation pocket 140. The saw blade 154 (shown in FIG. 3) is not visible because the saw blade 154 is covered by a blade guard 155 in FIG. 2. A blade guard 155 is used for a felling head 118 when not in use.

Figures 3A, 3B, 3C:
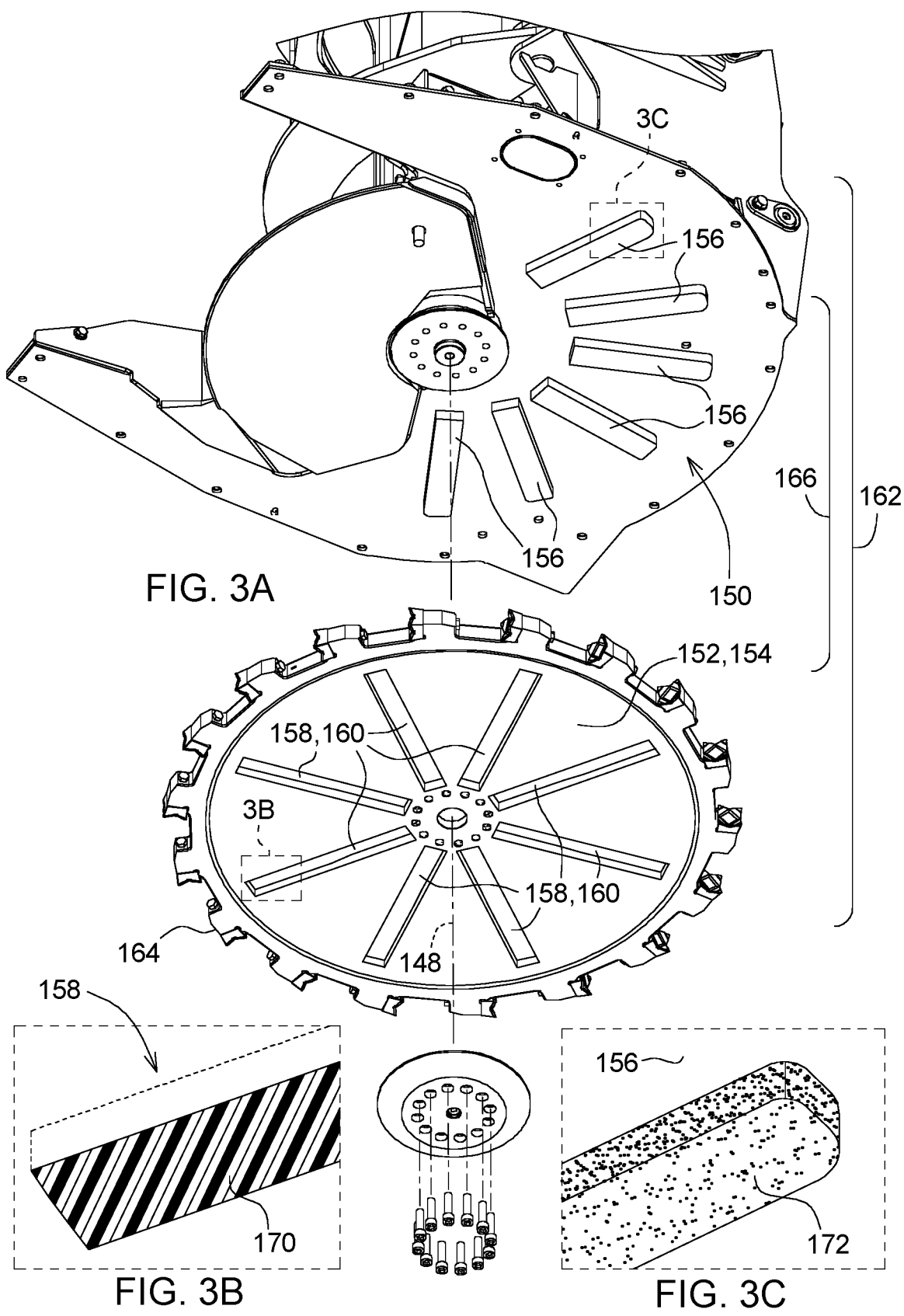
FIG. 3A is an exploded view of a portion of a feller head, according to an embodiment with axially directed flux.
FIG. 3B is detailed view of the slots on a rotor comprising a non-ferrous filling.
FIG. 3C is a detailed view of the coils on the stator comprising a protective coating.

Now turning the FIG. 3A, the felling head 118 comprises a stator 150 and a rotor 152. The stator 150 and rotor 152 replace the traditional hydraulic motor used in felling heads to provide the prime force for the saw blade 154. The stator 150 will typically have coils 156 thereon adapted to produce a time varying magnetic field. The rotor 152 will have either a set of slots 158 or a set of permanent magnets 160 mounted thereon facing the stator and adapted to produce an axially directed flux. Alternatively, in FIG. 4, the rotor 152 will have either a set of slots 158 or a set of permanent magnets 160 mounted thereon facing the stator and adapted to produce a radially directed flux.

Returning to FIG. 3, the rotor may be rotatably 152 coupled to the stator 150 in axial alignment therewith by the time varying stator magnetic field. The rotor 152 and stator 150, referred henceforth also as a motor assembly 162, is a type of electric motor. This motor assembly 162 may be a stepper motor that converts electrical pulses into specific rotational movement. The movement created by each pulse is precise and repeatable. Stepper motors perform optimally in instances requiring quick changes in speed, and high torque. Stepper motors generally come in two varieties, permanent magnet and variable reluctance. Permanent magnet motors include a rotor 152 that supports permanent magnets 160 and a stator 150 that supports coils 156 in proximity to the permanent magnets 160 of the rotor 152. The interaction of the permanent magnets 160 supported by the rotor 152 and the currents in the coils 156 supported by the stator 150 generate a force for driving the saw blade 154. These permanent magnets 160 may have oppositely directed directions of magnetization 176 (as designated by the alternating S and N shown in a portion of FIG. 5C; note that although only a portion of oppositely directed directions of magnetization 176 is shown and oppositely directed directions of magnetization may encompass all radially spaced permanent magnets). Generally, when no power is applied, a permanent magnet 160 tends to cause the "cog" while the rotor is revolved, while variable reluctance motors almost spin freely. Cogging is the torque or force pulsation produced by the interaction of the rotating magnets with the stator teeth (not shown). The rotor 152 and stator 150 are spaced apart axially to define a gap 166 therebetween (Note the gap 166 in FIG. 3A is exaggerated as it is an exploded view). Please note the features identified as permanent magnets 160 in FIG. 3 to represent a permanent magnet motor, may alternatively be slots 158, to represent a variable reluctance motor.

In another embodiment, the motor assembly 162 may be a variable reluctance motor (also referred to as switch reluctance motors) comprising of slots 158 on the rotor 152. Variable reluctance motors operate on the principle that a magnetic field created about a component (i.e. the rotor 152 in this embodiment) formed from a magnetically permeable material will exert a mechanical force on that component (i.e. the rotor 152). The magnetic field created is dependent on geometry. The mechanical force will urge the component to become aligned with the magnetic flux (lines of force) generated by the magnetic field. Thus, by using the stator 150 to establish and rotate a magnetic field about a rotor 152 formed from magnetically permeable material, the rotor 152 can be driven to rotate relative to the stator 150. The resistance to the passage of this magnetic flux from the stator 150 to the rotor 152 is referred to as reluctance. The magnitude of this reluctance changes with the rotational position of the rotor 152 relative to the stator 150. In one embodiment, the coils 156 are multiphase coils for producing the time varying magnetic field of the stator. Torque is produce by switching current into each of the phase coils 156, so that a magnetic force of attraction results between the rotor and stator poles that are approaching each other. Force is generated in the rotor by circulating currents that attempt to maximize the inductance. The current may be switched off in each phase before the rotor poles nearest the stator poles of the phase rotate past the aligned position. Otherwise the magnetic force of attraction could produce a negative or braking torque.

Figure 4A:
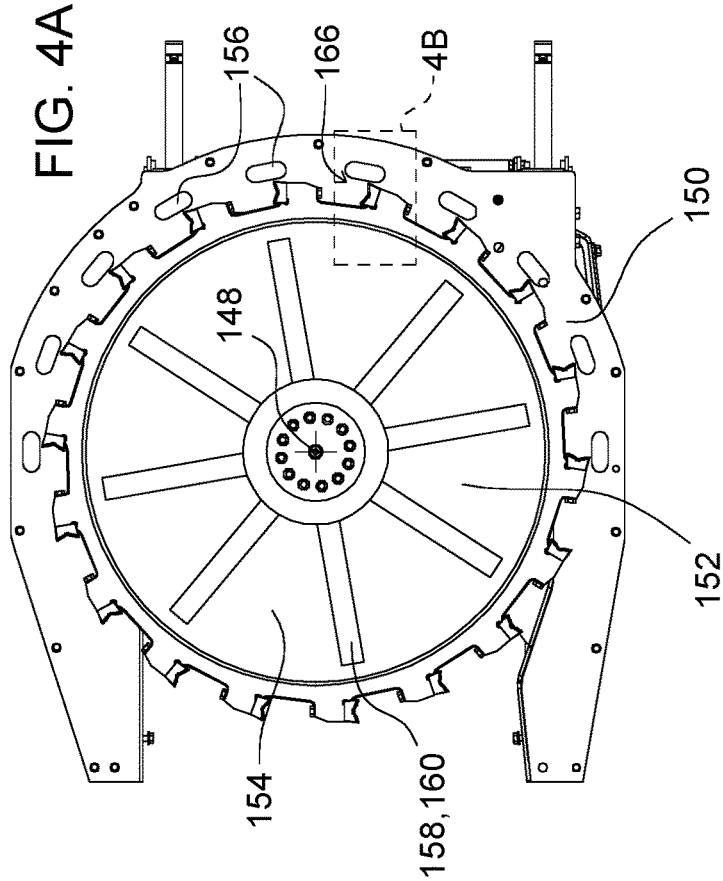
FIG. 4A is a bottom view of a feller head, according to one embodiment with a radially directed flux.
Figure 4B:
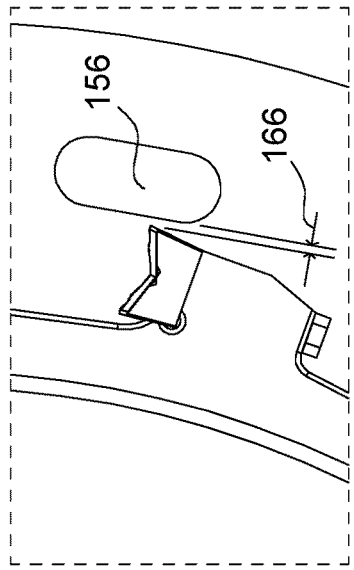
FIG. 4B is a detailed view of a portion of the feller head shown in FIG. 4A.
Figure 4:
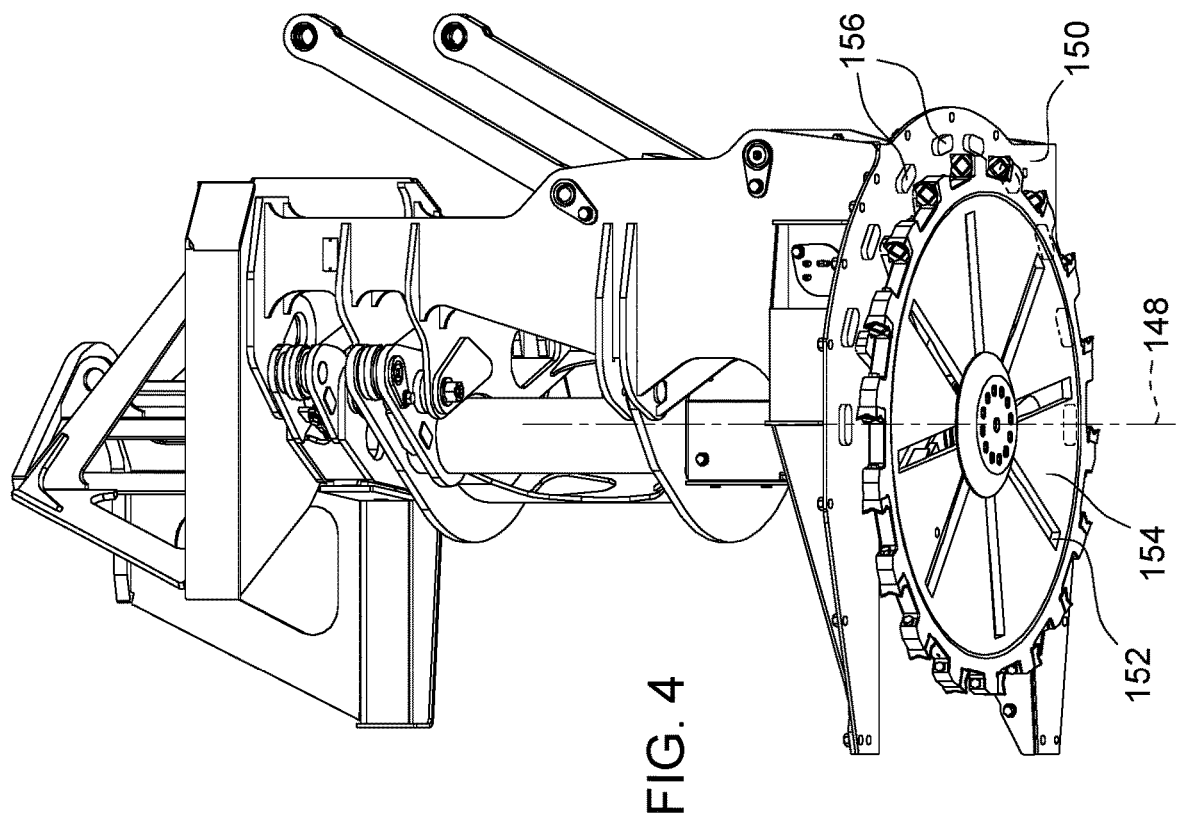
FIG. 4 is a perspective view of a feller head, according to another embodiment with a radially directed flux.

In an alternative embodiment, FIG. 4 shows a felling head 118 comprising a stator 150 having coils 156 thereon adapted to produce a time varying stator magnetic field, a rotor 152 having at least one of a set of slots 158 or a set of permanent magnets 160 mounted thereon facing the stator 150 and adapted to produce a radially directed flux, wherein the rotor 152 is rotatably coupled to the stator 150 in axial alignment therewith by the time varying stator magnetic field. In the embodiment shown in FIG. 4, the flux flows radially through an air gap 166 between the rotor 152 and the stator 150. Contrary to the embodiment shown in FIG. 3, the coils 156 on the stator 150 are located radially along a portion of the perimeter of the rotor 152 from the axis of rotation 148. FIG. 4A is a bottom view of the rotor 152 coupled with the stator 150 adapted to produce a radially directed flux. As discussed below, only a partial flux is required because intermittent pulses of power is an effective means of cutting woody vegetation. This partial flux is applicable to a motor assembly 162 adapted to produce either an axially directed flux or a radially directed flux.

Although the present embodiment describes a single rotor 152, and single stator 150, the felling head 118 may comprise additional rotors 152 and stators 150 for increased torque.

The rotor 152 is of circular shape and is usually the moving part coupled to the support frame 136 of the felling head 118 and stator 150 is generally fixed to the support frame 136 in some way. This is the preferred arrangement, because it avoids commutating the power leads to the stator 150, but this is merely convenient and not essential. With the present embodiment, either the rotor 152 or the stator 150 may be generally fixedly coupled to the support frame 136. Either arrangement is useful. For convenience of description it is assumed that the stator 150 is generally fixedly coupled to the support frame 136 and the rotor 152 is the moving part.

The rotor 152 may further comprise a saw blade wherein the saw blade comprises cutting teeth 164. In the embodiments shown in FIGS. 3 and 4, the saw blade 154 is integrated into the rotor 152 itself, thereby eliminating the typical dependency on an inefficient hydraulic motor system driven through the machine 100 typically used to power the saw blade 154. In one embodiment, the rotor 152 comprises a cutting blade or cutting teeth along a substantial portion of the perimeter of the rotor 152. By integrating the saw blade 154 into the rotor 152, a multitude of opportunities arise in optimizing the use of the felling head 118. For example, the creation of space from removing any coupling fixtures (e.g. a gear box) of the hydraulic motor to the saw blade 154 creates a new window and line of sight for the operator when seated in the cab 106 (shown in FIG. 1). Furthermore, this reduction of bulk may reduce the overall size of the felling head 118 or allow space to introduce additional features (e.g. sensors, lasers, wireless technologies, radars).

In the motor assembly 162, the saw blade inertia must be sufficient to damp out the torque ripple of the saw blade. In an alternative embodiment (not shown), the saw blade 154 may be coupled to the rotor 152 or the stator 150 (either of which is the moving component) of the motor assembly 162, rather than be fully integrated into the rotor 152, whereby the power generated from the motor assembly 162 (i.e. the stator and motor) can be translated to the saw blade 154 through another means.

FIGS. 5(a) through 5(f) represent schematic views of stator and rotor configurations for a partial axially directed flux. Note the stator 150 and rotor 152 are shown overlapping. A stator 150 having coils 156 (shown in solid lines) adapted thereon are disposed circumferentially on at least a portion of the stator 150 at intervals about an axis of the stator 168. The axis of the stator 168 may coincide with the axis of rotation 148 (shown in FIG. 3). In one embodiment, the portion of the stator 150 where the coils 156 are disposed do not overlap with the accumulation pocket 140 of the support frame 136 (shown in FIG. 2). The set of slots 158 or the set of permanent magnets 160 on the rotor 152 (as shown by the dotted lines) may also be disposed circumferentially about an axis of the rotor 174. The axis of the rotor 174 may also coincide with the axis of rotation 148.

A full 360 degrees engagement of the rotor 152 and the stator 150 may not be possible when nearly 180 degrees of the rotor 152 may overlap with the accumulation pocket 140 (as shown in FIG. 2). Alternatively, the coils 156 are disposed on less than half the stator 150, or span less than 180 degrees of the stator 150. In another embodiment, the coils may be disposed in more than 180 degrees of the stator 150 if a feller buncher 100 was customized for increased torque. In the area of woody vegetation cutting, a partial axial flux, that is placement of the coils 156 on a portion of stator 150, is highly effective as the power for the saw blade 154 does not need to be continuous. The rotational inertia of the saw blade 154 assists in cutting. Partial axial flux is advantageous because the intermittent power, or torque pulses, in the motor assembly 162 and the saw blade 154 are damped out by the saw blade inertia and when the saw blade 154 interacts with the woody vegetation. Torque pulses or torque ripple is the periodic increase or decrease in output torque as the motor shaft rotates. It is measured as the difference in maximum and minimum torque over one complete revolution, generally expressed as a percentage.

Now turning to FIG. 3C, the coils 156 on the stator 150 may further comprise a protective coating 172. The protective coating 172 may be, although not limited to, an epoxy wherein the coils 156 may then be enclosed in a non-ferrous metallic structure. The protective coating 172 is intended to be adequately robust to withstand forest environments where exposure to water, ice, snow, and mud are common.

As shown in FIG. 3B, the set of slots 158 of the rotor 152 may comprise a non-ferrous filling 170 (e.g. aluminum or plastic) such that saw blade 154 as integrated with the rotor 152 does not accumulate debris when in contact with trees and other woody vegetation. The non-ferrous filling 170 is adequately robust to withstand rotational speeds of about 1200 rpm (rotations per minute) as well as the transient and dynamic loads with cutting and handling trees.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A felling head for a forestry machine configured adapted to cut timber, the felling head comprising:
   a support frame, wherein the support frame comprises an accumulation pocket, an accumulating arm, and a harvest arm;
   a stator coupled to the support frame, the stator having coils thereon adapted to produce a time varying stator magnetic field;
   a rotor having at least one of a set of slots and a set of permanent magnets mounted thereon facing the stator and adapted to produce at least one of an axially directed flux and a radially directed flux;
   wherein the rotor is rotatably coupled to the stator in axial alignment therewith by the time varying stator magnetic field, and
   wherein the rotor further comprises a saw blade, the rotor and the saw blade creating a unitary body, the saw blade adapted to cut timber.

2. The felling head of claim 1, wherein the coils are disposed circumferentially on at least a portion of the stator at intervals about an axis of the stator.

3. The felling head of claim 2, wherein the portion of the stator does not overlap with an accumulation pocket of a support frame.

4. The felling head of claim 1, wherein the coils are disposed on less than half the stator.

5. The felling head of claim 1, wherein the coils further comprise a protective coating.

6. The felling head of claim 1, wherein the stator coils are multiphase coils for producing the time varying magnetic field of the stator.

7. The felling head of claim 1, wherein the at least one set of slots and the set of permanent magnets are disposed circumferentially about an axis of the rotor.

8. The felling head of claim 1, wherein the set of slots comprise a non-ferrous filling.

9. The forestry machine of claim 1, wherein the set of permanent magnets have oppositely directed directions of magnetization.

10. The felling head of claim 1, wherein the rotor and the stator are spaced apart to define a gap therebetween.

11. A forestry machine adapted to cut timber, the forestry machine comprising:
    a stator having coils thereon adapted to produce a time varying stator magnetic field;
    a rotor having at least one of a set of slots or a set of permanent magnets mounted thereon facing the stator and adapted to produce at least one of an axially directed flux and a radially directed flux;
    wherein the rotor is rotatably coupled to the stator in axial alignment therewith by the time varying stator magnetic field, and
    wherein the rotor further comprises a saw blade, the rotor and the saw blade creating a unitary body, the saw blade adapted to cut timber.

12. The forestry machine of claim 11, wherein the coils are disposed circumferentially on at least a portion of the stator at intervals about an axis of the stator.

13. The forestry machine of claim 11, wherein the coils are disposed circumferentially on at least a portion of the stator at intervals about an axis of the stator.

14. The forestry machine of claim 11, wherein the coils further comprise a protective coating.

15. The forestry machine of claim 11, wherein the stator coils are multiphase coils for producing the time varying magnetic field of the stator.

16. The forestry machine of claim 11, wherein the at least one of the set of slots and the set of permanent magnets are disposed circumferentially about an axis of the motor.

17. The forestry machine of claim 11, wherein the set of slots comprise a non-ferrous filling.

18. The forestry machine of claim 11, wherein the set of permanent magnets have oppositely directed directions of magnetization.

19. The forestry machine of claim 11, wherein the rotor and the stator are spaced apart to define a gap therebetween.

* * * * *